United States Patent
Chapman et al.

[11] Patent Number: 5,815,239
[45] Date of Patent: Sep. 29, 1998

[54] CONTACT LENSES PROVIDING IMPROVED VISUAL ACUITY

[76] Inventors: Judith E. Chapman, 1024 Royal Dr., Victor, N.Y. 14564; Ian G. Cox, 462 Eastbrooke La., Rochester, N.Y. 14618; Graham W. Biddle, 7156 County Line Rd., Ontario, N.Y. 14519; Timothy L. Comstock, 193 Chestnut Hill Dr., Rochester, N.Y. 14617; Kevin J. DeRyke, 1406 Viking Cir., Webster, N.Y. 14580

[21] Appl. No.: 760,789

[22] Filed: Dec. 5, 1996

[51] Int. Cl.⁶ .................................................. G02C 7/04
[52] U.S. Cl. .................. 351/177; 351/160 R; 351/160 H
[58] Field of Search .......................... 351/160 R, 160 H, 351/161, 162, 177

[56] References Cited

U.S. PATENT DOCUMENTS

| | | | |
|---|---|---|---|
| 3,482,906 | 12/1969 | Volk | 351/160 |
| 3,933,411 | 1/1976 | Winner | 351/160 |
| 4,195,919 | 4/1980 | Shelton | 351/160 |
| 4,199,231 | 4/1980 | Evans | 351/160 |
| 5,050,981 | 9/1991 | Roffman | 351/177 |
| 5,220,359 | 6/1993 | Roffman | 351/177 |

FOREIGN PATENT DOCUMENTS

| | | |
|---|---|---|
| 2499256 | 8/1982 | France . |
| 94/23327 | 10/1994 | WIPO . |

*Primary Examiner*—Scott J. Sugarman
*Attorney, Agent, or Firm*—John E. Thomas

[57] ABSTRACT

A method for obtaining contact lenses having optimized visual acuity involves providing the anterior surface or the posterior surface of the contact lens with a conic section having a shape factor value within the range of about 0.3 to 2.0, the shape factor value being selected so as to adjust spherical aberration in the central optical zone to a value within the range of about −0.2 diopter to about −0.6 diopter and to a value that provides optimal visual acuity.

14 Claims, 1 Drawing Sheet

CONTACT LENSES PROVIDING IMPROVED VISUAL ACUITY

BACKGROUND OF THE INVENTION

Contact lenses intended for correcting myopia (nearsightedness) or hypermetropia (farsightedness) have a central optical zone that imparts a negative or positive spherical correction (also referred to as power correction) to the lens. Zones peripheral to the optical zone are mainly provided for fitting. The term "spherical contact lens" is often used to denote a contact lens intended for correcting myopia or hypermetropia having spherical or near-spherical surfaces, as distinguished from lenses having a toroidal surface that imparts a cylindrical correction to compensate for an astigmatism. However, as known in the art, even though spherical posterior and anterior surfaces provide acceptable visual acuity, spherical aberration may be introduced into the lens due to the geometry of the lenses. One manner used to compensate for spherical aberration has involved providing a lens surface with asphericity in an attempt to eliminate the spherical aberration.

SUMMARY OF THE INVENTION

The present invention provides a method for obtaining contact lenses having improved visual acuity. The method comprising providing at least one of the anterior surface or the posterior surface of the contact lens with a conic section having a shape factor value within the range of about 0.3 to 2.0, the shape factor value being selected so as to adjust spherical aberration in the central optical zone to a value within the range of about −0.2 diopter to about −0.6 diopter and to a value that improves visual acuity.

According to various embodiments, the invention involves correlating conic section shape factors with aberration values within the range of about −0.2 to −0.6 diopter for a specific contact lens design, then determining the aberration value and associated shape factor that improves visual acuity.

Preferably, the shape factor value is selected so as to adjust spherical aberration in the central optical zone to a value within the range of about −0.2 diopter to about −0.6 diopter and to a value that optimizes visual acuity for a given lens design or power.

According to the other embodiments, the invention relates to providing contact lenses having optimized visual acuity over a series of contact lenses, each lens in the series having a different power correction. For each lens in the series conic shape factors are correlated with aberration values over the range of about −0.2 to −0.6 diopter, and the aberration value and associated shape factor that provides optimized visual acuity is determined for each contact lens in the series.

BRIEF DESCRIPTION OF THE DRAWING

The sole FIGURE illustrates schematically a sectional view of a representative contact lens.

DETAILED DESCRIPTION OF PREFERRED EMBODIMENTS

Figure 1:
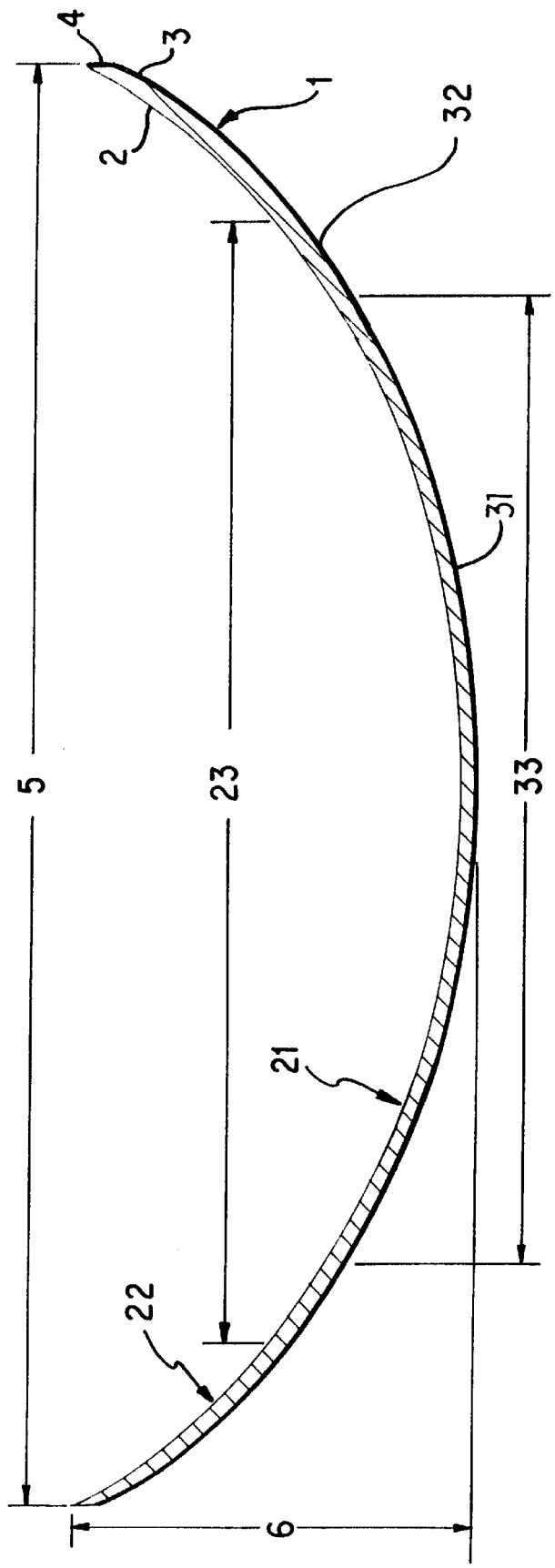

With reference to the FIGURE, contact lens 1 has a posterior (or back) surface 2 and an anterior (or front) surface 3 meeting at edge 4. Posterior surface 2 comprises central zone 21 and peripheral zone 22. Anterior surface 3 has a central zone 31 (the curved portion forming central zone 31 also referred to as the anterior power curve) extending across a central portion 33 of the anterior surface. The anterior surface may be formed of a single curve, or, as shown in the FIGURE, may include a peripheral zone 32 (the curved portion forming peripheral zone 32 also referred to as the anterior carrier curve). As known in the art, the anterior central zone 31 and posterior central zone 21 combine to form the optical zone and provide the lens with a given refractive correction.

The contact lens will typically have a lens diameter 5 at the posterior surface of about 12 to about 17 mm, especially about 13 to about 15 mm. The central zone 21 will typically have a chordal diameter 23 of about 5 to about 15 mm, especially about 6 to about 12 mm. The peripheral zone 22 will typically extend about 2.0 to about 12.0 mm from the edge of the lens inwardly toward the lens center, preferably extending about 2.0 to about 8.0 mm.

As known in the art, the equivalent base curve is defined by the lens diameter and saggital depth 6, and can be expressed mathematically as follows:

$$R = \frac{S^2 + (D/2)^2}{2S}$$

wherein
R=base curve radius of curvature (also referred to as equivalent base curve)
S=saggital depth (overall lens height—center thickness)
D=diameter.

The equivalent base curve will typically range from about 7.5 to 9.5 mm, and more typically within the range of about 8.0 to 9.2 mm.

The sag of a conic section (or a second-order surface of revolution) is expressed by the following known equation:

$$S = \frac{cx^2}{1 + (1 - \rho c^2 x^2)^{1/2}}$$

wherein
x is the radial distance from the vertex
c is $1/R$ where R is the base curve radius of curvature
$\rho$ is shape factor (or $1-e^2$ where e is the eccentricity)
When $\rho$ is 1, the conic section is a sphere. When $0<\rho<1$, the conic section is a ellipse. When $\rho>1$, the conic section is an ellipse having a steeper surface due to a negative eccentricity.

As mentioned, spherical aberration may be introduced into the lens due to the geometry of the lenses. Whereas prior approaches have sought to reduce or eliminate spherical aberration by providing a lens surface with asphericity to compensate for the spherical aberration, it is an objective of the present invention to adjust spherical aberration in the lens to a value that improves visual acuity.

The invention is based on several findings.

It was found that lenses having a "minus power aberration" provide better visual acuity than lenses having a "plus power aberration".

The direction of aberration is determined by measuring the power of the lens at two different diameters within the optical zone. If the power measurement is more minus (i.e., a higher minus value, or a lower plus value) at the larger diameter than at the smaller diameter, then the direction of aberration is termed a "minus power aberration". If the power measurement is more plus (i.e., a lower minus value, or a higher plus value) at the larger diameter than at the smaller diameter, then the direction of aberration is termed a "plus power aberration". Power measurements at the two diameters can be made using commercially available lens measuring equipment, one example being metrology gauges available under the tradename ConTest (Rotlex Optics Ltd., D.N. Arava, Israel). Measurements reported in the following Table 1 were performed at diameters of 4 mm and 6 mm within the optical zone.

TABLE 1

| Lens Power | Anterior Shape Factor | Posterior Shape Factor | Lens Aberration | Anterior Shape Factor | Posterior Shape Factor | Lens Aberration |
|---|---|---|---|---|---|---|
| −9.00 | 1.00 | 1.00 | −0.65 | 1.20 | 1.00 | −0.49 |
| −8.50 | 1.00 | 1.00 | −0.61 | 1.20 | 1.00 | −0.45 |
| −8.00 | 1.00 | 1.00 | −0.58 | 1.20 | 1.00 | −0.41 |
| −7.50 | 1.00 | 1.00 | −0.55 | 1.20 | 1.00 | −0.37 |
| −7.00 | 1.00 | 1.00 | −0.51 | 1.10 | 1.00 | −0.42 |
| −6.50 | 1.00 | 1.00 | −0.48 | 1.10 | 1.00 | −0.38 |
| −6.00 | 1.00 | 1.00 | −0.44 | 1.00 | 1.00 | −0.44 |
| −5.50 | 1.00 | 1.00 | −0.41 | 1.00 | 1.00 | −0.41 |
| −5.00 | 1.00 | 1.00 | −0.37 | 0.90 | 1.00 | −0.49 |
| −4.50 | 1.00 | 1.00 | −0.34 | 0.90 | 1.00 | −0.46 |
| −4.00 | 1.00 | 1.00 | −0.30 | 0.90 | 1.00 | −0.43 |
| −3.50 | 1.00 | 1.00 | −0.26 | 0.90 | 1.00 | −0.40 |
| −3.00 | 1.00 | 1.00 | −0.23 | 0.90 | 1.00 | −0.37 |
| −2.50 | 1.00 | 1.00 | −0.19 | 0.90 | 1.00 | −0.34 |
| −2.00 | 1.00 | 1.00 | −0.15 | 0.80 | 1.00 | −0.53 |
| −1.50 | 1.00 | 1.00 | −0.11 | 0.80 | 1.00 | −0.55 |
| −1.00 | 1.00 | 1.00 | −0.08 | 0.80 | 1.00 | −0.65 |
| +1.00 | 1.00 | 1.00 | 0.08 | 0.60 | 1.00 | −0.22 |
| +1.50 | 1.00 | 1.00 | 0.12 | 0.60 | 1.00 | −0.27 |
| +2.00 | 1.00 | 1.00 | 0.17 | 0.60 | 1.00 | −0.29 |
| +2.50 | 1.00 | 1.00 | 0.21 | 0.60 | 1.00 | −0.30 |
| +3.00 | 1.00 | 1.00 | 0.25 | 0.60 | 1.00 | −0.31 |
| +3.50 | 1.00 | 1.00 | 0.29 | 0.50 | 1.00 | −0.40 |
| +4.00 | 1.00 | 1.00 | 0.34 | 0.50 | 1.00 | −0.41 |
| +4.50 | 1.00 | 1.00 | 0.38 | 0.50 | 1.00 | −0.41 |
| +5.00 | 1.00 | 1.00 | 0.42 | 0.50 | 1.00 | −0.41 |
| +5.50 | 1.00 | 1.00 | 0.47 | 0.50 | 1.00 | −0.41 |
| +6.00 | 1.00 | 1.00 | 0.52 | 0.50 | 1.00 | −0.41 |

Table 1 illustrates aberration values over a series of lenses having power corrections ranging from −9.00 to +6.00 diopter. The design of these lenses is consistent with the FIGURE. As listed in the left-hand columns of Table 1, when the posterior and anterior surfaces were formed of spherical curves ($\rho=1$), spherical aberration ranged from −0.65 to 0.52 diopter across the power series. The right-hand columns list aberration values and associated conic section shape factors providing optimized visual acuity for each power in the contact lens series.

It was found that lenses having an aberration in the range of about −0.2 to −0.6 diopter will provide optimized visual acuity for the majority of contact lenses wearers across the power series. It will be appreciated that it is not an objective of the invention to provide a lens that has no spherical aberration, rather, contact lenses according to the invention have an aberration value adjusted to a value that improves visual acuity, and preferably to a value that optimizes visual acuity, and wherein the spherical aberration is a value within the range discussed above.

In the right-hand columns of Table 1, it can be seen that when the contact lens was provided with a conic surface having a shape factor value other than 1, the aberration value was adjusted to a value within the desired range.

For contact lenses having a power within the range of −6 to −12 diopter, conic sections having a $\rho$ value within the range of about 0.6 to 2.0, most preferably within the range of about 0.8 to 1.8, correlate with the spherical aberration value providing optimized visual acuity. As shown in the left-hand columns of Table 1, the lenses in this power series having spherical surfaces ($\rho=1$) generally had a minus power aberration, whereas it was found that surfaces of these lenses in the power series should be adjusted to a lower minus aberration value to improve visual acuity.

For contact lenses having a power within the range of −1 to −5 diopter, conic sections having a p value within the range of about 0.6 to 1.0, most preferably within the range of about 0.7 to 0.9, correlate with the spherical aberration value providing optimized visual acuity. Again referencing the left-hand columns of Table 1, lenses in this power serious having spherical surfaces ($\rho=1$) generally had a minus power aberration, whereas it was found that surfaces of these lenses in the power series should be adjusted to a higher minus aberration value to obtain lenses offering improved visual acuity.

For contact lenses having a power within the range of +1 to +9 diopter, conic sections having a shape factor value within the range of about 0.3 to 0.7, most preferably within the range of about 0.4 to 0.6, correlate with the spherical aberration value providing optimized visual acuity. Referencing Table 1, lenses in this power series having spherical surfaces ($\rho=1$) generally had a plus power aberration, whereas it was found that surfaces of these lenses in the power series should be adjusted to a minus power aberration.

The spherical aberration value that provides optimized visual acuity may vary for a given power as well as for a specific lens design. In practice, the optimal aberration value can be determined as follows.

First, test lenses having a given power correction are provided, the test lenses consisting of lenses with lens surfaces that include several different conic section shape factors (for example, shape factors varying in increments of 0.10). Preferably, the number of types of test lenses will be limited to conic section shape values within the ranges discussed above for that power series.

Second, the test lenses are measured to confirm which conic section shape factor values provide a lens having spherical aberration within the within desired range of about −0.2 to −0.6 diopter. The measurements can be made by measuring power at two diameters within the optical zone of the lens, as discussed above.

It will be appreciated the primary objective of the above steps is to correlate conic section shape factors with spherical aberration values for the specific lens design or power, especially to correlate conic section shape factors with those aberration values within the range of −0.2 to −0.6 diopter.

Having correlated conic section shape factors and spherical aberration values, the primary objective of the next steps is to determine the spherical aberration value and its associated shape factor that provides optimal visual acuity. Accordingly, the test lenses from the second step are compared clinically to determine the lens having an aberration value and associated shape factor that provides optimal visual acuity for wearers.

Finally, having determined the desired aberration value for the power correction and lens design, and the associated shape factor, contact lenses can now be manufactured that incorporate the selected conic section shape factor into a lens surface.

Conventionally, contact lenses are molded from contact lens molds including molding surfaces that replicate the contact lens surfaces when a lens is cast in the molds. Accordingly, from a practical standpoint, contact lenses according to the invention are manufactured by providing contact lens molds having a molding surface that replicates the desired conic section shape factor, and casting the lenses in the molds.

Various embodiments of the present invention are evident. As a first example, contact lenses having designs differing from those schematically illustrated in the FIGURE are within the scope of the invention. Other variations and embodiments will be evident to one skilled in the art.

We claim:

1. A method of improving visual acuity of a contact lens, said lens comprising a posterior surface and an anterior surface and including a central optical zone, said method comprising providing the anterior surface with a conic section having a shape factor value within the range of about 0.3 to 2.0, said shape factor value being selected so as to adjust spherical aberration in the central optical zone to a value within the range of about −0.2 diopter to about −0.6 diopter and to a value that provides improved visual acuity.

2. The method of claim 1, wherein the contact lens has a power within the range of −6 to −12 diopter and wherein the method comprises providing the anterior surface with a conic section having a shape factor value within the range of about 0.6 to 2.0.

3. The method of claim 2, wherein the anterior surface has a conic section having a shape factor value within the range of about 0.8 to 1.8.

4. The method of claim 1, wherein the contact lens has a power within the range of −1 to −5 diopter and wherein the method comprises providing the anterior surface with a conic section having a shape factor value within the range of about 0.6 to 1.0.

5. The method of claim 4, wherein the anterior surface has a conic section having a shape factor value within the range of about 0.7 to 0.9.

6. The method of claim 1, wherein the contact lens has a power within the range of +1 to +9 diopter and wherein the method comprises providing the anterior surface with a conic section having a shape factor value within the range of about 0.3 to 0.7.

7. The method of claim 6, wherein the anterior surface has a conic section having a shape factor value within the range of about 0.4 to 0.6.

8. A method of determining a contact lens design that optimizes visual acuity, comprising:

correlating conic section shape factors with aberration values for a specific contact lens design, said aberration values being within the range of −0.2 to −0.6 diopter; and determining the aberration value and associated shape factor that provides optimal visual acuity.

9. A method of improving visual acuity of contact lenses in a series of contact lenses, each contact lens in the series having a different power correction, said method comprising:

correlating conic shape factors with aberration values for each contact lens in the series, the aberration values being values within the range of about −0.2 to −0.6 diopter, determining the aberration value and associated shape factor for each contact lens in the series that provides optimal visual acuity for the individual contact lens in the series, and providing contact lenses with lens surfaces having conic sections that incorporate the aberration value and associated shape factor improving visual acuity.

10. The method of claim 9, further comprising providing a series of contact lens molds, each mold having a molding surface that replicates the lens surfaces having conic sections incorporating the aberration value and associated shape factor providing optimal visual acuity; and molding lenses in said molds.

11. A contact lens comprising a posterior surface and an anterior surface and including a central optical zone, wherein the anterior surface has a conic section with a shape factor in the range of about 0.4 to 1.6 and that is selected so that spherical aberration in the central optical zone is adjusted to a value within the range of about −0.2 to −0.6 diopter and to a value that provides optimal visual acuity.

12. The contact lens of claim 11, wherein the posterior surface includes a curve peripheral to the central optical zone.

13. The contact lens of claim 12, wherein the anterior surface includes a curve peripheral to the central optical zone.

14. A series of contact lenses comprising contact lenses having different power corrections, wherein each contact lens in the series has an anterior surface that has a conic section with a shape factor in the range of about 0.4 to 1.6 and that is selected so that an aberration value in the central optical zone is within the range of about −0.2 diopter to −0.6 diopter and is a value that provides optimal visual acuity.

* * * * *